US009331757B2

(12) United States Patent
Nazar et al.

(10) Patent No.: US 9,331,757 B2
(45) Date of Patent: May 3, 2016

(54) OPEN LOOP SPATIAL PROCESSING

(75) Inventors: Shahrokh Nayeb Nazar, Quebec (CA);
Robert L. Olesen, Huntington, NY
(US); Manasa Raghavan, West
Babylon, NY (US); **Muhammad U.
Fazili, Audubon, PA (US); William E.
Lawton, Parker Ford, PA (US); Yingxue
K. Li**, Exton, PA (US)

(73) Assignee: InterDigital Patent Holdings, Inc.,
Wilmington, DE (US)

( * ) Notice: Subject to any disclaimer, the term of this
patent is extended or adjusted under 35
U.S.C. 154(b) by 1 day.

(21) Appl. No.: 13/457,145

(22) Filed: Apr. 26, 2012

(65) Prior Publication Data
US 2012/0275530 A1    Nov. 1, 2012

Related U.S. Application Data

(60) Provisional application No. 61/480,459, filed on Apr. 29, 2011.

(51) Int. Cl.
*H04B 7/02*    (2006.01)
*H04B 7/04*    (2006.01)
*H04L 25/02*    (2006.01)
*H04L 25/03*    (2006.01)

(52) U.S. Cl.
CPC ............. *H04B 7/0456* (2013.01); *H04B 7/022*
(2013.01); *H04L 25/0206* (2013.01); *H04L
25/03343* (2013.01); *H04L 2025/03426*
(2013.01)

(58) Field of Classification Search
None
See application file for complete search history.

(56) References Cited

U.S. PATENT DOCUMENTS

| 2010/0091905 | A1 | 4/2010 | Khan |
| 2011/0051835 | A1 | 3/2011 | Yuan et al. |
| 2011/0149765 | A1* | 6/2011 | Gorokhov et al. ............. 370/252 |
| 2011/0305223 | A1* | 12/2011 | Koo et al. ..................... 370/335 |

(Continued)

FOREIGN PATENT DOCUMENTS

| EP | 2 312 886 | 4/2011 |
| WO | 2010/048129 | 4/2010 |
| WO | 2010/050718 | 5/2010 |

OTHER PUBLICATIONS

Qualcomm Incorporated, "Remaining aspects of PRB bundling," 3GPP TSG-RAN WG1 #62bis, R1-105572 (Oct. 11-15, 2010).

(Continued)

*Primary Examiner* — Adolf DSouza
(74) *Attorney, Agent, or Firm* — Julian F. Santos

(57) ABSTRACT

Methods and apparatus for multiple-input multiple-output (MIMO) transmissions are disclosed. A base station may precode wireless transmit/receive unit (WTRU)-specific reference signals and data that are transmitted to a WTRU using a randomly selected precoder. The precoder may be selected based on a predefined precoder selection sequence or by the base station. A different precoder may be applied to different resource blocks (RBs). In addition, a large delay cyclic delay diversity (CDD) or discrete Fourier transform (DFT) spreading may be applied on the WTRU-specific reference signals and the data. For heterogeneous deployed antennas, spatial diversity gain is achieved by dynamically scheduling resources between transmission points. A hopping scheme may be applied across the transmission points as the resources are dynamically partitioned between the transmission points. A different randomly selected precoder may be applied to each RB transmitted from a different transmission point.

16 Claims, 5 Drawing Sheets

(56) References Cited

U.S. PATENT DOCUMENTS

2012/0039233 A1* 2/2012 Kim et al. .................. 370/312
2012/0064846 A1* 3/2012 Yokomakura et al. ........ 455/101

OTHER PUBLICATIONS

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.1.0 (Mar. 2011).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2011).

* cited by examiner

OPEN LOOP SPATIAL PROCESSING

CROSS REFERENCE TO RELATED APPLICATIONS

This application claims the benefit of U.S. provisional application No. 61/480,459, filed Apr. 29, 2011, the contents of which are hereby incorporated by reference herein.

FIELD OF THE INVENTION

This application is related to wireless communications.

BACKGROUND

Both open-loop and closed-loop multiple-input multiple-output (MIMO) schemes in the form of spatial multiplexing (SM) have been introduced in $3^{rd}$ Generation Partnership Project (3GPP) long term evolution (LTE) Release 8 (R8) for downlink transmissions. Closed-loop spatial multiplexing refers to linearly pre-coded MIMO transmissions where either full or partial channel state information (CSI) is available at the transmitter. Open-loop spatial multiplexing corresponds to MIMO transmissions where CSI is not available at the transmitter or is partially available, (e.g., long-term measurements may be available but short-term measurements allowing fast adaptation are not). Open-loop spatial multiplexing is a good candidate for high mobility cases.

SUMMARY

Methods and apparatus for multiple-input multiple-output (MIMO) transmissions are disclosed. A base station may precode wireless transmit/receive unit (WTRU)-specific reference signals and data that are transmitted to a WTRU using a randomly selected precoder. The precoder may be selected based on a predefined precoder selection sequence or by the base station. A different precoder may be applied to different resource blocks (RBs). In addition, a large delay cyclic delay diversity (CDD) or discrete Fourier transform (DFT) spreading may be applied on the WTRU-specific reference signals and the data. For heterogeneous deployed antennas, spatial diversity gain is achieved by dynamically scheduling resources between transmission points. A hopping scheme may be applied across the transmission points as the resources are dynamically partitioned between the transmission points. A different randomly selected precoder may be applied to each RB transmitted from a different transmission point.

BRIEF DESCRIPTION OF THE DRAWINGS

A more detailed understanding may be had from the following description, given by way of example in conjunction with the accompanying drawings wherein.

DETAILED DESCRIPTION

Figure 1A:
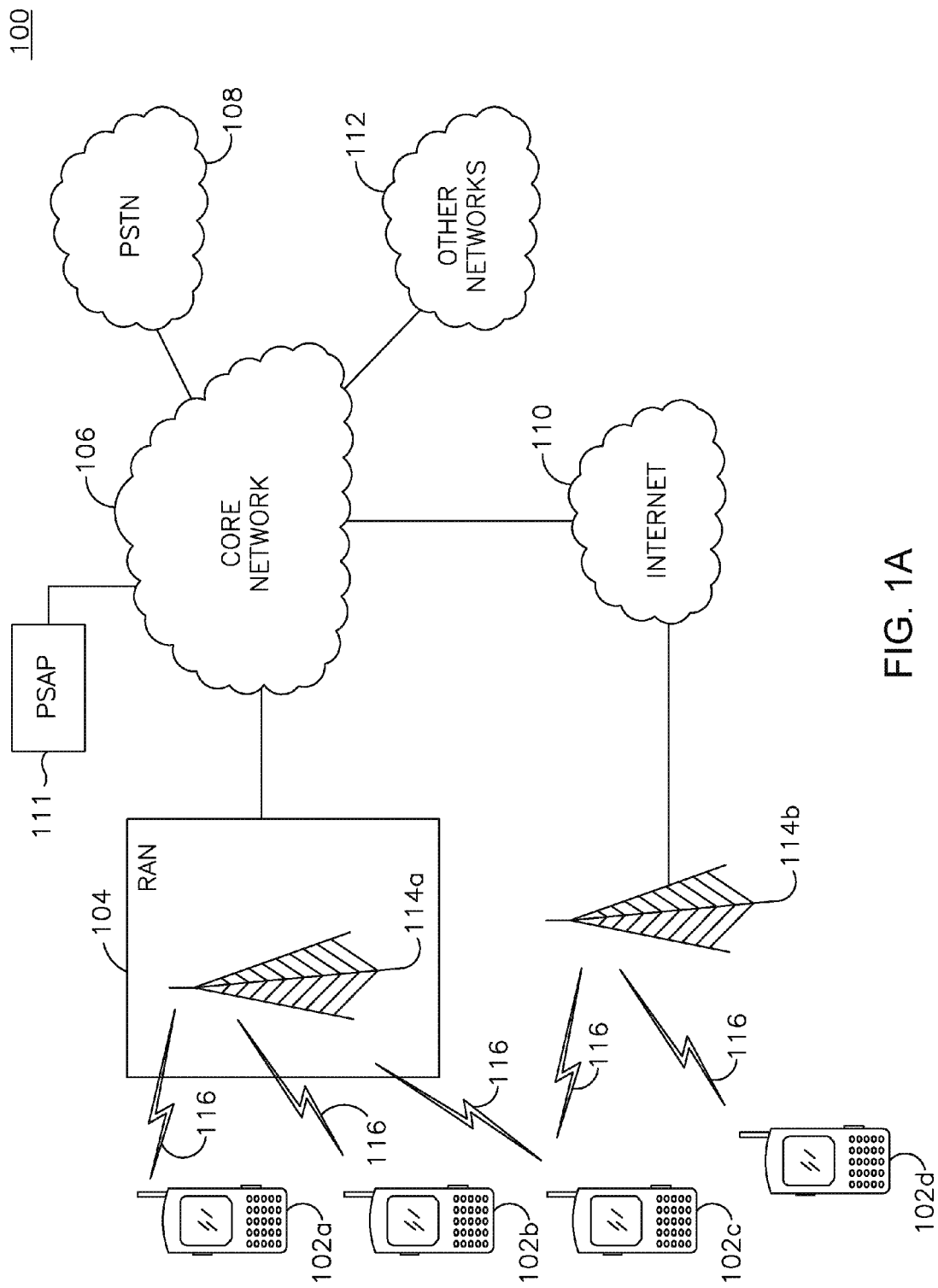
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode-B, a Home Node-B, a Home eNode-B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, etc.), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
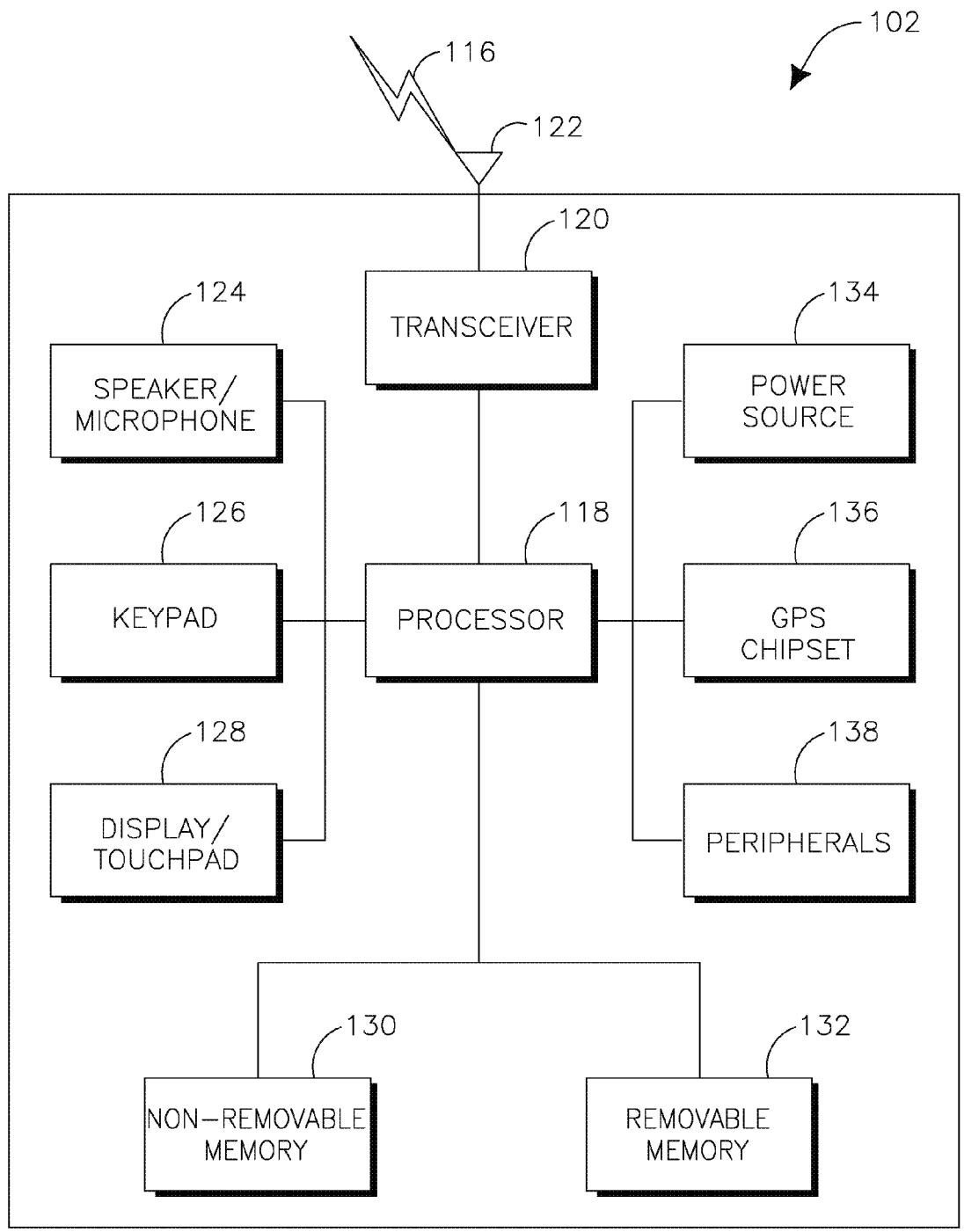
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information, (e.g., longitude and latitude), regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
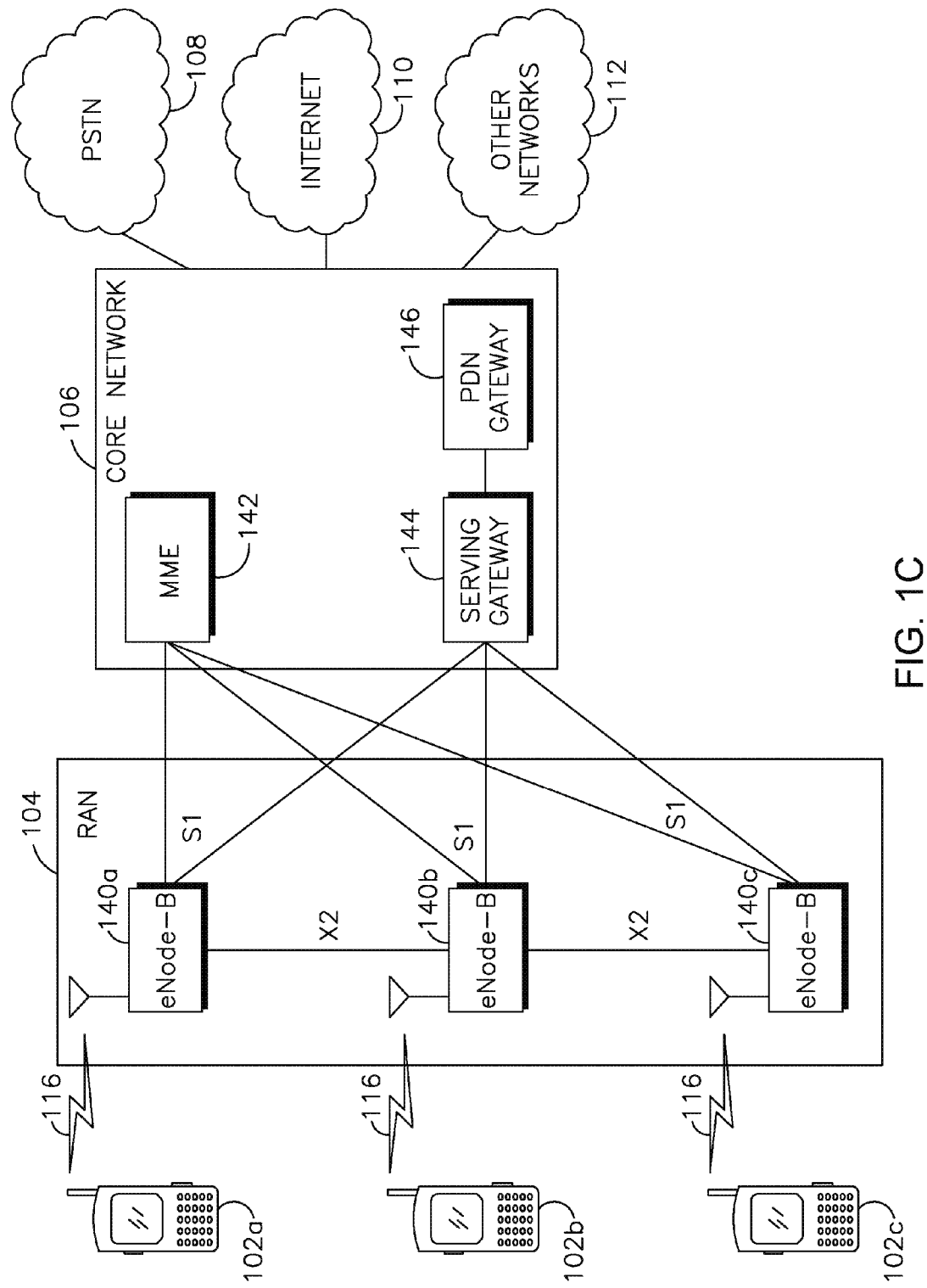
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
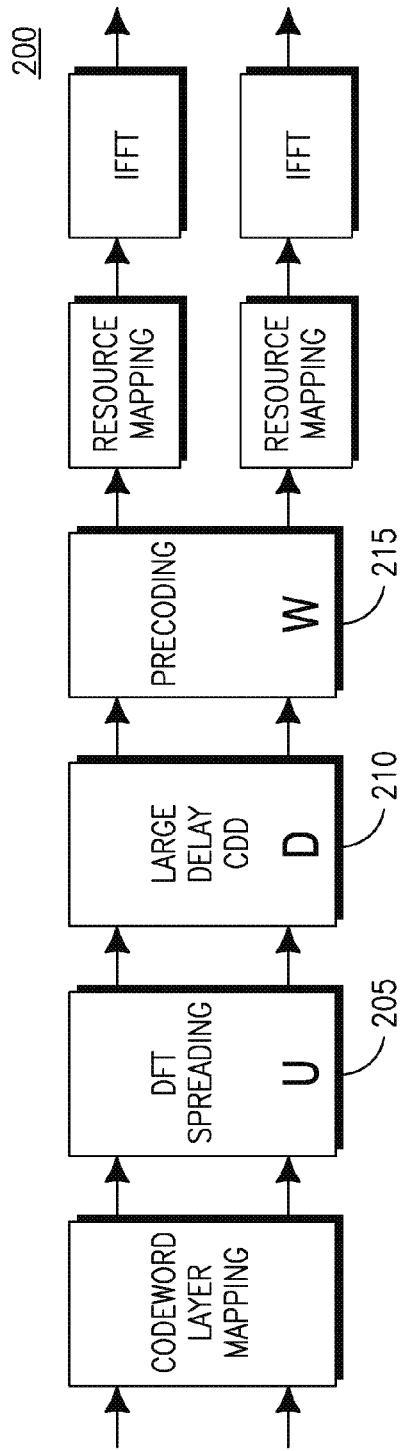
FIG. 2 illustrates a transmit chain of open-loop spatial multiplexing in long term evolution release 8.

FIG. 2 illustrates a transmit chain 200 of open-loop spatial multiplexing in LTE Release 8 (LTE R8). Codewords are precoded through the use of a combination of three matrices, where the matrix U 205 in the chain 200 is a fixed DFT precoder, the matrix D(i) 210 is a diagonal matrix representing the large delay cyclic delay diversity (CDD) functionality, and the matrix W 215 is the precoder defined for close-loop spatial multiplexing.

The closed-loop precoding scheme in LTE-Advanced (LTE-A), (referring also to LTE Release 10 and beyond), is extended over the LTE R8 scheme to support configurations with up to 8 transmit antennas in the downlink using a WTRU-specific reference signal to improve data coverage.

In low speed conditions, the closed-loop spatial multiplexing (CL-SM) mode may significantly improve downlink data throughput by using precoding on the transmitted signal before the channel has changed significantly. For moderate and high speed conditions, due to estimation and transmission delays, it is difficult to provide reliable and accurate channel state information (CSI) at the base station. In such cases, the open-loop SM (OL-SM) schemes may perform better than the CL-SM schemes.

The OL-SM may be used to reduce the uplink feedback signaling overhead. For instance, in LTE Release 11 (LTE R11), multi-cell coordinated multi-point transmission (CoMP) may improve the overall cell throughput and efficiency. For efficient CoMP operations, the WTRU may feedback CSI for multiple transmission points (TPs). This implies that the amount of feedback overhead in CoMP may significantly increase, particularly for a large number of WTRUs.

In general, the benefit of OL-SM is reduced by antenna correlation. This problem may be addressed to some extent by using cross polarized antennas. However, as the technology evolves from more conventional deployment types to new heterogeneous deployments, such as those using a shared cell ID distributed antennas approach, an additional de-correlation between the spatial streams at different transmission points may be obtained. Techniques, such as OL-SM may be particularly beneficial in some specific deployment scenarios, such as those using a shared cell identity (ID) distributed antenna scheme, regardless of the WTRU velocity.

With the introduction of WTRU-specific reference signals or WTRU-specific demodulation reference signals (DM-RS) for use in CL-SM in LTE R10, the downlink (DL) multi-user (MU)-MIMO performance may be significantly improved. However, the open-loop MIMO operation in LTE R8 was originally designed to offer a competitive performance as compared to single-user (SU)-MIMO using cell-specific reference signals (CRS). Therefore, OL-SM schemes which demonstrate an improvement in MU-MIMO performance over that of LTE R8 or LTE R10 are of importance.

Described herein are OL-SM methods using DM-RS for homogeneous and heterogeneous deployments. In an example method, data and reference symbols are jointly precoded using a single precoder. In particular, DM-RS and data, (i.e., identified with a physical downlink shared channel (PDSCH)), that are transmitted to a WTRU may be precoded using a randomly selected precoder. The precoder may belong to a codebook which contains a set of precoders known to both the base station and the WTRU. Hereafter, the random precoder selection may refer to a predefined precoder selection sequence or a precoder determined by the base station and not necessarily known to the WTRU. In the case where the WTRU does not know the exact precoder used by the base station for a given transmission, it may be assumed that dedicated pilots may be transmitted by the base station and used by the WTRU for data demodulation. The term dedicated pilots may refer to CRS' or DM-RS'. In an example, DM-RS' are transmitted by the base station and used by the WTRU for data demodulation.

Figure 3:
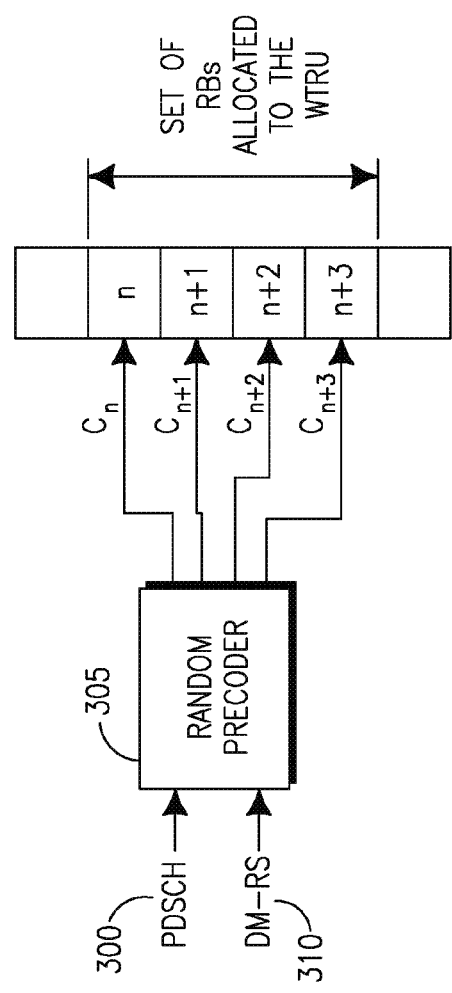
FIG. 3 shows an example random precoding block diagram.

As shown in FIG. 3, a PDSCH allocation 300 may comprise multiple resource blocks (RBs) . . . , n, n+1, n+2, n+3, . . . , and a randomly selected precoder 305 may be different for different RBs . . . , n, n+1, n+2, n+3, . . . . In this example method, the DM-RSs 310 and associated data channel(s) (i.e., the PDSCHs) 300 sweep different directions across multiple RBs which may cause the channel to appear ergodic or different at the WTRU(s). The term Cn refers to a specific occurrence of a precoder codevector that is derived from W(i) as shown herein below.

The WTRU may be configured through either physical layer signaling, (via, for example, a physical data control channel (PDCCH)), or higher layer signaling. The signaling may include precoding granularity information, i.e., information indicating the number of RBs applicable to a randomly selected precoder.

In case of per-RB precoding, the WTRU may perform channel estimation on a single RB. Alternatively, in order to improve channel estimation performance at the WTRU, a randomly selected precoder may be applied across multiple RBs. In this case, the WTRU may perform channel estimation using multiple RBs using, for example, interpolation and/or extrapolation.

The precoded P×1 vector for OL-SM, (where P is the number of transmit antennas), may be defined as follows:

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix}, \quad \text{Equation (1)}$$

where the precoding matrix W(i) is of size P×ν with ν as the number of layers and/or the number of streams for transmission of the PDSCH and i=0, 1, . . . , $M_{symb}^{layer}-1$ with $M_{symb}^{layer}$ the number of modulation symbols to transmit per layer for a physical channel.

For p={5,6, . . . , ν+6}, the WTRU may assume that the base station cyclically assigns different precoders to different vectors $[x^{(0)}(i) \ldots x^{(\upsilon-1)}(i)]^T$ on the PDSCH as described herein below. A different precoder may be used in every P'$N_{SC}^{RB}$ vector, where $N_{SC}^{RB}$ denotes a resource block size in the frequency domain, (expressed as a number of subcarriers), and P' is the precoding resource block group (RBG), (expressed as a number of RBs in the frequency domain). In case the WTRU is not configured with PRB bundling, P'=1.

The precoder may be selected according to W(i)=$C_k$, where k is the precoder index given by $$k = \left( \left\lfloor \frac{i}{P'N_{sc}^{RB}} \right\rfloor \mod N_C \right) + 1 \in \{1, 2, \ldots, N_C\}$$

and $N_C$ denotes the maximum number of precoders within the codebook containing the set of precoders for a given number of layers. Other methods to select the precoder from the codebook may also be implemented.

In another example method, a combination of random precoding, cyclic delay diversity (CDD) and discrete Fourier Transform (DFT) spreading may be used. In particular, the DM-RS' and data that are to be transmitted to a WTRU may be first precoded using a randomly selected precoder. The precoding granularity may be either per RB or per RBG and each precoder may belong to a codebook which contains a set of precoders known to both the base station and the WTRU. A large delay CDD followed by DFT spreading may be applied at the sub-carrier level on the PDSCH. The composite effect of large delay CDD and DFT spreading may provide signal-to-interference and noise ratio (SINR) averaging across layers for a given channel realization. Each codeword may be transmitted across antennas.

The use of random precoding may cause a different SINR realization over each layer. FIG. 3 shows the example random precoding. In this example method, both DM-RS and data are subject to the same precoding operation. Therefore, by performing channel estimation using DM-RS, the WTRU may estimate the effective channel for reception of the PDSCH data.

For large-delay CDD, precoding for SM is defined by:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(\nu-1)}(i) \end{bmatrix}, \quad \text{Equation (2)}$$

where the precoding matrix $W(i)$ is of size $P \times \nu$ and $i = 0, 1, \ldots, M_{symb}^{layer} - 1$. The matrix $U$ is a fixed DFT precoder, and the matrix $D(i)$ is a diagonal matrix representing the large delay CDD functionality. The diagonal size—$\nu \times \nu$ matrix $D(i)$ supporting cyclic delay diversity and the size—$\nu \times \nu$ matrix $U$ may be given by Table 1 for $\nu \in \{2,3,4\}$ layers. For $\nu \in \{5,6,7,8\}$, the matrix $U$ and diagonal matrix $D(i)$ may be given by Tables 2 and 3, respectively. As described herein above, the matrix $W$ is the precoder defined for CL-SM. For $p = \{5, 6, \ldots, \nu+6\}$, the WTRU may assume that the base station cyclically assigns different precoders to different vectors $[x^{(0)}(i) \ldots x^{(\nu-1)}(i)]^T$ on the PDSCH wherein a different precoder is used every $P'N_{SC}^{RB}$ vectors.

TABLE 1

| Number of layers $\nu$ | U | D(i) |
|---|---|---|
| 2 | $\frac{1}{\sqrt{2}} \begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}} \begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2} \begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

TABLE 2

| Number of layers $\nu$ | U |
|---|---|
| 5 | $\frac{1}{\sqrt{5}} \begin{bmatrix} 1 & 1 & 1 & 1 & 1 \\ 1 & e^{-j2\pi/5} & e^{-j4\pi/5} & e^{-j6\pi/5} & e^{-j8\pi/5} \\ 1 & e^{-j4\pi/5} & e^{-j8\pi/5} & e^{-j12\pi/5} & e^{-j16\pi/5} \\ 1 & e^{-j6\pi/5} & e^{-j12\pi/5} & e^{-j18\pi/5} & e^{-j24\pi/5} \\ 1 & e^{-j8\pi/5} & e^{-j16\pi/5} & e^{-j24\pi/5} & e^{-j32\pi/5} \end{bmatrix}$ |
| 6 | $\frac{1}{\sqrt{6}} \begin{bmatrix} 1 & 1 & 1 & 1 & 1 & 1 \\ 1 & e^{-j2\pi/6} & e^{-j4\pi/6} & e^{-j6\pi/6} & e^{-j8\pi/6} & e^{-j10\pi/6} \\ 1 & e^{-j4\pi/6} & e^{-j8\pi/6} & e^{-j12\pi/6} & e^{-j16\pi/6} & e^{-j20\pi/6} \\ 1 & e^{-j6\pi/6} & e^{-j12\pi/6} & e^{-j18\pi/6} & e^{-j24\pi/6} & e^{-j30\pi/6} \\ 1 & e^{-j8\pi/6} & e^{-j16\pi/6} & e^{-j24\pi/6} & e^{-j32\pi/6} & e^{-j40\pi/6} \\ 1 & e^{-j10\pi/6} & e^{-j20\pi/6} & e^{-j30\pi/6} & e^{-j40\pi/6} & e^{-j50\pi/6} \end{bmatrix}$ |
| 7 | $\frac{1}{\sqrt{7}} \begin{bmatrix} 1 & 1 & 1 & 1 & 1 & 1 & 1 \\ 1 & e^{-j2\pi/7} & e^{-j4\pi/7} & e^{-j6\pi/7} & e^{-j8\pi/7} & e^{-j10\pi/7} & e^{-j12\pi/7} \\ 1 & e^{-j4\pi/7} & e^{-j8\pi/7} & e^{-j12\pi/7} & e^{-j16\pi/7} & e^{-j20\pi/7} & e^{-j24\pi/7} \\ 1 & e^{-j6\pi/7} & e^{-j12\pi/7} & e^{-j18\pi/7} & e^{-j24\pi/7} & e^{-j30\pi/7} & e^{-j36\pi/7} \\ 1 & e^{-j8\pi/7} & e^{-j16\pi/7} & e^{-j24\pi/7} & e^{-j32\pi/7} & e^{-j40\pi/7} & e^{-j48\pi/7} \\ 1 & e^{-j10\pi/7} & e^{-j20\pi/7} & e^{-j30\pi/7} & e^{-j40\pi/7} & e^{-j50\pi/7} & e^{-j60\pi/7} \\ 1 & e^{-j12\pi/7} & e^{-j24\pi/7} & e^{-j36\pi/7} & e^{-j48\pi/7} & e^{-j60\pi/7} & e^{-j72\pi/7} \end{bmatrix}$ |

TABLE 2-continued

| Number of layers $v$ | U |
|---|---|
| 8 | $\frac{1}{2\sqrt{2}}\begin{bmatrix} 1 & 1 & 1 & 1 & 1 & 1 & 1 & 1 \\ 1 & e^{-j2\pi/8} & e^{-j4\pi/8} & e^{-j6\pi/8} & e^{-j8\pi/8} & e^{-j10\pi/8} & e^{-j12\pi/8} & e^{-j14\pi/8} \\ 1 & e^{-j4\pi/8} & e^{-j8\pi/8} & e^{-j12\pi/8} & e^{-j16\pi/8} & e^{-j20\pi/8} & e^{-j24\pi/8} & e^{-j28\pi/8} \\ 1 & e^{-j6\pi/8} & e^{-j12\pi/8} & e^{-j18\pi/8} & e^{-j24\pi/8} & e^{-j30\pi/8} & e^{-j36\pi/8} & e^{-j42\pi/8} \\ 1 & e^{-j8\pi/8} & e^{-j16\pi/8} & e^{-j24\pi/8} & e^{-j32\pi/8} & e^{-j40\pi/8} & e^{-j48\pi/8} & e^{-j56\pi/8} \\ 1 & e^{-j10\pi/8} & e^{-j20\pi/8} & e^{-j30\pi/8} & e^{-j40\pi/8} & e^{-j50\pi/8} & e^{-j60\pi/8} & e^{-j70\pi/8} \\ 1 & e^{-j12\pi/8} & e^{-j24\pi/8} & e^{-j36\pi/8} & e^{-j48\pi/8} & e^{-j60\pi/8} & e^{-j72\pi/8} & e^{-j84\pi/8} \\ 1 & e^{-j14\pi/8} & e^{-j28\pi/8} & e^{-j42\pi/8} & e^{-j56\pi/8} & e^{-j70\pi/8} & e^{-j84\pi/8} & e^{-j98\pi/8} \end{bmatrix}$ |

TABLE 3

| Number of layers $v$ | D(i) |
|---|---|
| 5 | $\begin{bmatrix} 1 & 0 & 0 & 0 & 0 \\ 0 & e^{-j2\pi i/5} & 0 & 0 & 0 \\ 0 & 0 & e^{-j4\pi i/5} & 0 & 0 \\ 0 & 0 & 0 & e^{-j6\pi i/5} & 0 \\ 0 & 0 & 0 & 0 & e^{-j8\pi i/5} \end{bmatrix}$ |
| 6 | $\begin{bmatrix} 1 & 0 & 0 & 0 & 0 & 0 \\ 0 & e^{-j2\pi i/6} & 0 & 0 & 0 & 0 \\ 0 & 0 & e^{-j4\pi i/6} & 0 & 0 & 0 \\ 0 & 0 & 0 & e^{-j6\pi i/6} & 0 & 0 \\ 0 & 0 & 0 & 0 & e^{-j8\pi i/6} & 0 \\ 0 & 0 & 0 & 0 & 0 & e^{-j10\pi i/6} \end{bmatrix}$ |
| 7 | $\begin{bmatrix} 1 & 0 & 0 & 0 & 0 & 0 & 0 \\ 0 & e^{-j2\pi i/7} & 0 & 0 & 0 & 0 & 0 \\ 0 & 0 & e^{-j4\pi i/7} & 0 & 0 & 0 & 0 \\ 0 & 0 & 0 & e^{-j6\pi i/7} & 0 & 0 & 0 \\ 0 & 0 & 0 & 0 & e^{-j8\pi i/7} & 0 & 0 \\ 0 & 0 & 0 & 0 & 0 & e^{-j10\pi i/7} & 0 \\ 0 & 0 & 0 & 0 & 0 & 0 & e^{-j12\pi i/7} \end{bmatrix}$ |
| 8 | $\begin{bmatrix} 1 & 0 & 0 & 0 & 0 & 0 & 0 & 0 \\ 0 & e^{-j2\pi i/8} & 0 & 0 & 0 & 0 & 0 & 0 \\ 0 & 0 & e^{-j4\pi i/8} & 0 & 0 & 0 & 0 & 0 \\ 0 & 0 & 0 & e^{-j6\pi i/8} & 0 & 0 & 0 & 0 \\ 0 & 0 & 0 & 0 & e^{-j8\pi i/8} & 0 & 0 & 0 \\ 0 & 0 & 0 & 0 & 0 & e^{-j10\pi i/8} & 0 & 0 \\ 0 & 0 & 0 & 0 & 0 & 0 & e^{-j12\pi i/8} & 0 \\ 0 & 0 & 0 & 0 & 0 & 0 & 0 & e^{-j14\pi i/8} \end{bmatrix}$ |

In the event that the CDD may be applied to both the DM-RS and PDSCH, the large delay CDD would be equivalent to layer shifting. For example, in a four-layer transmission, on the first subcarrier of a given RB, layers 1,2,3,4 (in this order) are transmitted over 4 spatial channels; on the second subcarrier, layer 4,1,2,3 (in this order) are transmitted over 4 spatial channels, and so on. Since the DM-RS exists on the $1^{st}$, $2^{nd}$, $6^{th}$, $7^{th}$, $11^{th}$ and $12^{th}$ subcarriers, if the DM-RS is precoded in the same way as physical uplink shared channel (PUSCH) data, the channel estimation may be obtained as shown in Table 4.

TABLE 4

| | Subcarrier used for channel estimation | | | | | |
|---|---|---|---|---|---|---|
| | 1st | 2nd | 6th | 7th | 11th | 12th |
| Spatial channel to be estimated | $1^{st}$ and $2^{nd}$ | $2^{nd}$ and $3^{rd}$ | $4^{th}$ and $1^{st}$ | $1^{st}$ and $2^{nd}$ | $3^{rd}$ and $4^{th}$ | $4^{th}$ and $1^{st}$ |

As shown in Table 4, the DM-RS density becomes non-uniform across spatial channels, which may cause performance degradation. To improve DM-RS channel estimation, the channel estimation may be performed as shown in Table 5.

TABLE 5

| | Subcarrier used for channel estimation | | | | | |
|---|---|---|---|---|---|---|
| | 1st | 2nd | 6th | 7th | 11th | 12th |
| Spatial channel to be estimated | $1^{st}$ and $2^{nd}$ | $3^{rd}$ and $4^{th}$ | $1^{st}$ and $2^{nd}$ | $3^{rd}$ and $4^{th}$ | $1^{st}$ and $2^{nd}$ | $3^{rd}$ and $4^{th}$ |

As shown in Table 5, DM-RS becomes uniformly distributed. This DM-RS design may allow averaging or filtering between multiple symbols to further improve DM-RS channel estimation. In other words, in order to achieve the desired DM-RS property, the DM-RS may be precoded differently than data. For example, the large delay CDD matrix D(i) may be dropped in the DM-RS precoding. Alternatively, the DM-RS may be pre-shifted before precoding is performed if D(i) is desired.

In another example method, the data and DM-RS may be precoded separately. In this method, the DM-RS' and data to be transmitted to a WTRU may each be precoded using a different randomly selected precoder. The precoding granularity of PDSCH may be different from that of the DM-RS. The precoding granularity for the DM-RS may be either per RB or per RBG, while the precoding granularity for the PDSCH may be at the subcarrier-level, RB-level or RBG-level. Each precoder may belong to a different codebook, each containing a set of precoders. In this method, given that the DM-RS and data are subject to different precoding operations, the WTRU may assume that the transmit precoding information for both the DM-RS and PDSCH are known to both the base station and the WTRU.

In another example method, the precoding on the DM-RS may be completely bypassed, (i.e., no precoding is performed on DM-RS). Alternatively, the precoding on the DM-RS may be fixed or semi-static, (e.g., the WTRU may receive the DM-RS precoding information via radio resource control (RRC) signaling or the DM-RS precoding may be fixed in the specifications).

Given that the precoder applied to the DM-RS is different from that of the PDSCH, regardless of whether or not the DM-RS is precoded, the WTRU may not assume that the estimated channel using the DM-RS is the effective channel for the PDSCH detection. In other words, the WTRU may perform a channel estimation using the DM-RS for up to eight physical transmit antennas regardless of the number of layers, (assuming that the transmit precoding information is available). Accordingly, the WTRU may need to be informed regarding the number of physical transmit antennas in addition to the number of layers. The WTRU may obtain this information using one of the example methods described herein below.

In an example method, the WTRU may be semi-statically configured via higher layer signaling or informed through downlink allocation, (i.e., via a PDCCH), regarding the number of layers and the number of physical antennas at the base station.

In another example method, the WTRU may assume that the number of DM-RS antenna ports is the same as the number of channel state information reference signal (CSI-RS) antenna ports. In the event that multiple CSI-RS configurations are used in a given cell, the WTRU may assume one CSI-RS configuration may be associated with the number of DM-RS antenna ports. The WTRU may assume that the CSI-RS configuration with a non-zero transmission power is the reference configuration for implicit derivation of the number of DM-RS antenna ports. Alternatively, the WTRU may assume that one of the CSI-RS configurations with a zero transmission power may be the reference configuration for implicit derivation of the number of DM-RS antenna ports.

Alternatively, the WTRU may derive the number of DM-RS antenna ports blindly. Given that there is a 3 dB power boosting on the DM-RS when both code-division multiplexed groups are used for the DM-RS, the WTRU may blindly detect the number of DM-RS antenna ports through power detection.

In addition to random precoding, the large delay CDD together with DFT spreading may be applied at the subcarrier-level on the PDSCH. The WTRU may assume that information regarding the large delay CDD matrix, the DFT spreading matrix and the precoder are available for PDSCH detection.

The WTRU may use the channel estimates obtained from the DM-RS and derive the effective channel using the known precoding on the DM-RS. The WTRU may then detect the PDSCH based on the knowledge of the CDD, DFT, and precoder matrices used for data.

Described herein are example methods used for heterogeneous deployments and may be applicable to other deployments as well. Hereafter, the transmission point for geographically distributed antennas refers to a remote radio head (RRH), a relay, or a macro cell.

In order to achieve spatial diversity gain in the case of geographically distributed antennas at the transmitting side, the WTRU may receive each RB within its downlink allocation from different transmission points. This technique is particularly beneficial in cases where the signals transmitted from one or multiple transmission points are experiencing sever shadowing. The spatial diversity gain is achieved through the use of a channel encoder, which is applied on multiple RBs within a transport block.

Dynamic resource scheduling may be used to achieve spatial diversity gain. In this method, the scheduler performs dynamic resource partitioning between different transmission points in all domains including time, frequency, or space. Scheduling is performed based on the WTRU's channel quality feedback. More specifically, the base station may assign each transmission point a separate CSI-RS resource. The WTRU may then be configured via higher layer signaling with one or multiple CSI-RS configurations to perform channel measurement and provide channel quality feedback for each transmission point. In order to facilitate frequency domain scheduling, the channel quality reports may be per-subband, where a subband is a collection of sub-carriers that have been allocated for scheduling of data. In this case, unlike the legacy systems where the CSI-RS configuration is cell-specific, the CSI-RS configuration may be WTRU-specific. The WTRU may expect the configuration of CSI-RS and/or zero-power CSI-RS and physical multicast channel (PMCH) in the same subframe of a serving cell.

Transmission point hopping may be used to achieve spatial diversity gain. In this method, the scheduler may apply a hopping scheme across transmission points while performing dynamic resource partitioning in temporal and/or frequency domains. For a given subframe, the WTRU may receive each RB from a different or randomly selected transmission point. The transmission point may belong to a set of transmission points that are allocated by the scheduler to serve the WTRU. Given that each resource allocation comprises multiple RBs, by sweeping across different transmission points, the spatial diversity gain is maximized through the channel decoding process. The chance of experiencing severe shadowing by the WTRU is substantially reduced by randomly choosing a transmission point.

Described herein are transmission point pairing or sets. Transmission points that exhibit similar but uncorrelated channel conditions may be paired or defined in a set by the base station, for either dynamic resource scheduling or transmission point hopping. For example, transmission points in an indoor environment may be defined as belonging to the same set.

A transmission point set may be defined for transmission points which have a similar number of antennas, or similar rank capability. Alternatively, a transmission point set may be associated with a particular WTRU category, or categories, that it supports. Alternatively, a transmission point set may be associated with a particular CSI-RS measurement set. The OL-SM used at each transmission point may be as described herein above or a conventional OL-SM as specified in, for example, LTE R8.

Figure 4:
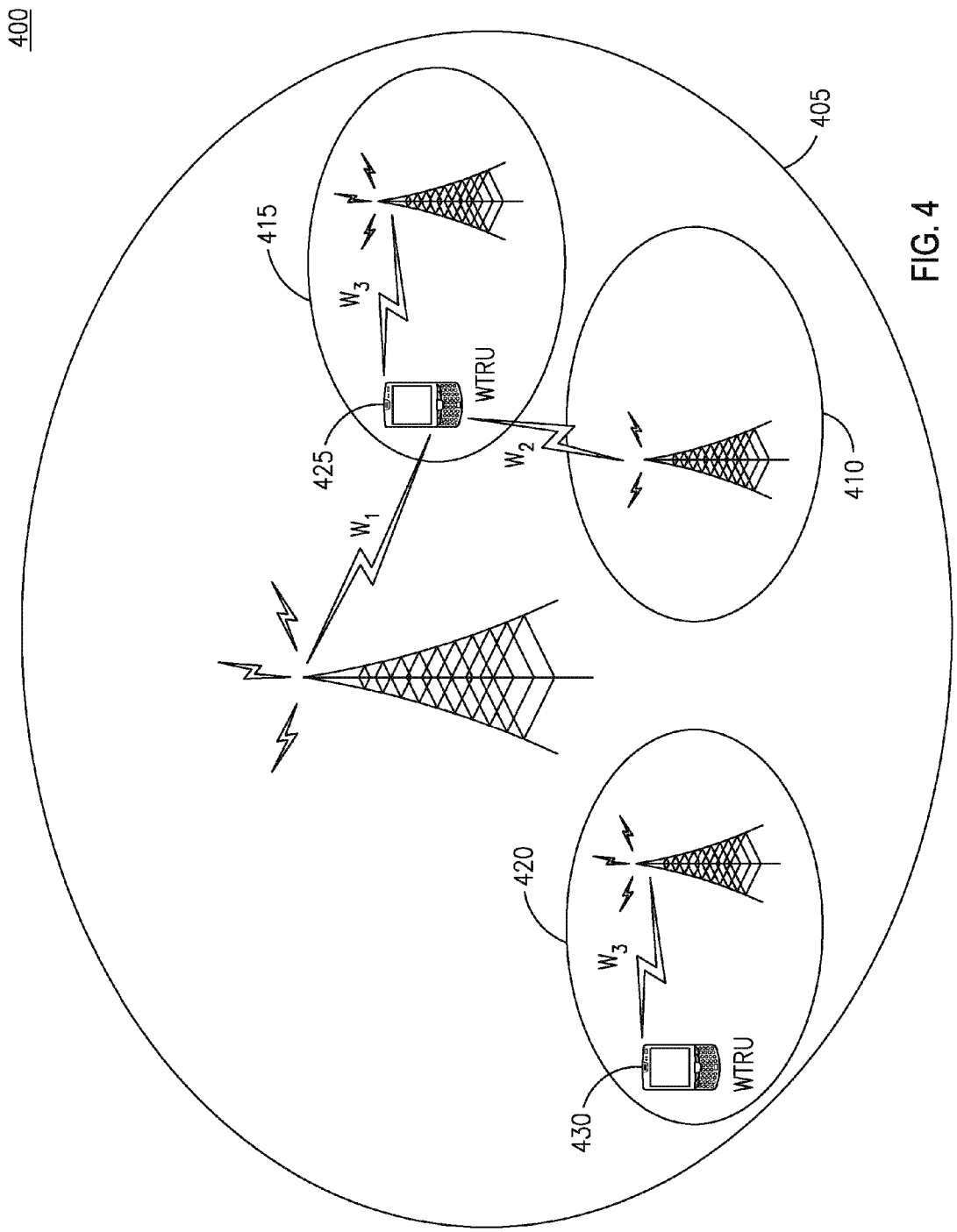
FIG. 4 shows an example open-loop spatial multiplexing from geographically distributed transmit antennas.

Described herein is an example method for precoding data and DM-RS jointly for at least heterogeneous deployments. A randomly selected precoder may be applied at each RB or RBG transmitted from a different transmission point. FIG. 4 shows an example OL-SM system 400 for geographically distributed transmit antennas. OL-SM system 400 may include a base station 405 defining a macro cell 405, a RRH 410, a RRH 415. a RRH 420, a WTRU 425 and a WTRU 430. When referring to random precoder selection, it should be understood that the sequence of precoder selection may be pre-defined and/or cyclical.

In one example method, the base station may define a set of cyclically defined precoders. The set of cyclically defined precoders may be cyclically rotated through a number of transmission points which use the same cell ID in a cell or may be defined for a transmission point set. In another example, the methods described herein may be applied to transmission points at the edge of the cell, to transmission points which exhibit a greater degree of interference from adjacent transmission points and/or to cells which use a different cell ID.

The precoded $P_l \times 1$ vector at the lth transmission point for OL-SM, (where $P_l$ is the number of transmit antennas at the lth transmission point), may be defined as follows:

$$\begin{bmatrix} y_l^{(0)}(i) \\ \vdots \\ y_l^{P_l-1}(i) \end{bmatrix} = W_l(i) \begin{bmatrix} x^{(0)}(i) \\ \vdots \\ x^{(\upsilon-1)}(i) \end{bmatrix}, \quad \text{Equation (3)}$$

where the precoding matrix $W_l(i)$ is of size $P_l \times v$ with v as the number of layers for transmission of the PDSCH, i=0, 1, ..., $M_{symb}^{layer}$-1 with $M_{symb}^{layer}$ as the number of modulation symbols to transmit per layer for a physical channel and l=0, 1, ..., L−1 with L as the number of transmission points serving the WTRU. For p={7,8, ..., v+6}, the WTRU may assume that the base station cyclically assigns different precoders and different transmission points to different vectors) $[x^{(0)}(i) ... x^{(v-1)}(i)]^T$ on the PDSCH.

The precoders used at each transmission point may belong to the same codebook or a different codebook, depending on the number of physical antennas and/or number of layers supported at each transmission point. The WTRU may not assume that the precoder applied at each RB within the multiple allocated RBs belongs to the same codebook. For example, assume that the set of transmission points which serves the WTRU 425 includes the base station 405 and two RRHs 410 and 415 and that the WTRU 425 is equipped with two antennas while the base station 405 and the two RRHs 410 and 415 are equipped with eight and four antennas, respectively. For transmission on two layers, (i.e., rank=2), the size of the precoder matrices used at the base station 405 is 8 by 2 while the size of those used at the RRHs 410 and 415 is 4 by 2.

Described herein is a combination of random precoding, CDD and DFT spreading used for at least heterogeneous deployments. In addition to random precoding, a combination of large delay CDD and/or DFT spreading may be applied to benefit from the increased frequency selectivity. For large delay CDD with DFT spreading, precoding for spatial multiplexing using geographically distributed antennas may be defined as follows:

$$\begin{bmatrix} y_l^{(0)}(i) \\ \vdots \\ y_l^{P_l-1}(i) \end{bmatrix} = W_l(i)D(i)U \begin{bmatrix} x^{(0)}(i) \\ \vdots \\ x^{(\upsilon-1)}(i) \end{bmatrix}, \quad \text{Equation (4)}$$

where the precoding matrix $W_l(i)$ is of size $P_l \times v$ and i=0, 1, ..., $M_{symb}^{layer}$-1. The diagonal size—$v \times v$ matrix D(i) supporting cyclic delay diversity and the size—$v \times v$ matrix U are both given in Table 1 for v∈ {2,3,4} layers and for v∈ {5,6,7,8}, the matrix U and diagonal matrix D(i) may be given by Table 2 and Table 3, respectively.

Described herein are methods to achieve spatial multiplexing using multiple transmission points. Different layers for OL-SM may be transmitted from different transmission points. This is particularly beneficial in cases where the signals transmitted from one transmission point are spatially correlated. The high spatial correlation results in significant reduction of MIMO channel capacity and may occur when antenna spacing is insufficient or there is a lack of rich scattering environment.

By splitting the layers across the uncorrelated geographically distributed antennas, the OL-SM may be used for high rank transmissions. In other words, the number of layers for spatial multiplexing may potentially exceed the four layers specified for OL-SM in LTE Rel-8.

The application of a fixed DFT-based precoding may ensure that the channel coefficients of the antenna ports are uncorrelated. In one example method, the fixed DFT precoder may be removed from the transmission chain. For large delay CDD, precoding for spatial multiplexing using geographically distributed antennas may be defined as follows:

$$\begin{bmatrix} y^{(0)}(i) \\ \vdots \\ y^{(P-1)}(i) \end{bmatrix} = W(i)D(i) \begin{bmatrix} x^{(0)}(i) \\ \vdots \\ x^{(\nu-1)}(i) \end{bmatrix}, \quad \text{Equation (5)}$$

where the precoding matrix W(i) is of size P×ν and i=0, 1, ..., $M_{symb}^{layer}$−1. The diagonal size—ν×ν matrix D(i) supporting cyclic delay diversity is given by Table 1 for ν ∈ {2,3,4} and Tables 2 and 3 for ν ∈ {5,6,7,8}, respectively.

Described herein are example channel quality indicator (CQI)/rank indicator (RI) reporting methods. Given that LTE R10 WTRUs and beyond may support DM-RS as part of transmission modes 8 and 9, the WTRU may be configured with transmission mode 8 or 9 or one of their descendents for OL-SM.

A number of channel quality indicator (CQI) or rank indicator (RI) reporting methods may be defined to support OL-SM. For aperiodic CSI feedback on PUSCH, reporting modes 2-0 and 3-0 from LTE R8 or R10 may be extended to transmission modes 8 and 9 or one of their descendents to support OL-SM, where reporting mode 2-0 refers to WTRU-selected subband feedback and reporting mode 3-0 refers to higher layer-configured subband feedback.

For transmission modes 8 and 9 in LTE R10, the reporting modes 2-0 and 3-0 are supported when the WTRU is configured without precoding matrix indicator (PMI)/RI reporting or when the number of CSI-RS ports is equal to one. However, to support OL-SM, there is a need for the WTRU to feedback both CQI and rank. The WTRU may be configured with multiple CSI-RS ports for channel measurements in order to support a rank higher than one. The WTRU may report an RI as a part of reporting modes 2-0 and 3-0. The restriction on the number of CSI-RS ports to be used by the WTRU for channel measurements under reporting modes 2-0 and 3-0 may be removed. In other words, for transmission modes 8 and 9, certain reporting modes may be supported on the PUSCH. For transmission mode 8, modes 1-2, 2-2, and 3-1 if the WTRU is configured with PMI/RI reporting and modes 2-0 and 3-0 if the WTRU is configured without PMI reporting. For transmission mode 9, modes 1-2, 2-2, and 3-1 if the WTRU is configured with PMI/RI reporting and number of CSI-RS ports>1 and modes 2-0 and 3-0 if the WTRU is configured without PMI reporting and number of CSI-RS ports≥1.

With respect to the WTRU procedures for reporting modes 2-0 and 3-0, for transmission modes 8 and 9, the WTRU may calculate the reported CQI values conditioned on the reported RI.

As for periodic CSI reporting using a physical uplink control channel (PUCCH), reporting modes 1-0 and 2-0 from LTE R8/10 may be extended to transmission modes 8 and 9 or one of their descendents to support OL-SM. In the context of LTE R8, reporting mode 1-0 represents wideband feedback and reporting mode 2-0 refers to WTRU-selected subband feedback.

Similar to aperiodic CSI reporting using PUSCH, there are currently some restrictions on the use of reporting modes 1-0 and 2-0 by the WTRU under transmission modes 8 and 9. To enable RI reporting and configuration of more than one CSI-RS port, the WTRU may support the following periodic CSI reporting. For transmission mode 8, modes 1-1 and 2-1 if the WTRU is configured with PMI/RI reporting and modes 1-0 and 2-0 if the WTRU is configured without PMI reporting. For transmission mode 9, modes 1-1 and 2-1 if the WTRU is configured with PMI/RI reporting and the number of CSI-RS ports>1 and modes 1-0 and 2-0 if the WTRU is configured without PMI reporting or the number of CSI-RS ports≥1.

With respect to the WTRU procedures for reporting modes 1-0 and 2-0, for transmission modes 8 and 9, the WTRU may calculate the CQI values conditioned on the last reported periodic RI.

In the above example, the rank report may be associated to a particular transmission point as a result of scheduling by the base station, or it may be associated with the combined rank of one or more transmission points. In the later case, the CQI reference sub-band for reporting CQI may assume the minimum of the rank of the associated transmission points. For more than two transmission points, this may by inference, imply the CQI report is for at least a 2 or greater rank.

The WTRU may transmit the CQI/RI reports using time division multiplexing (TDM) for transmission points defined in the above examples in a cyclic manner. In order to reduce the feedback overhead, a single rank report (RI) may be sent for one or multiple transmission points in a particular reporting instance.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented at a base station, comprising:
randomly selecting at least one precoder;
precoding wireless transmit/receive unit (WTRU)-specific reference signals and data using the at least one precoder to generate precoded WTRU-specific reference signals and precoded data, wherein precoding the WTRU-specific reference signals and the data comprises precoding the WTRU-specific reference signals differently than the data; and
transmitting the precoded WTRU-specific reference signals and the precoded data via a plurality of antennas to a WTRU.

2. The method of claim 1, wherein the at least one precoder is one of a predefined precoder selection sequence or a base station determined precoder.

3. The method of claim 1, further comprising:
selecting a first precoder for precoding a first resource block (RB); and
selecting a second precoder, different from the first precoder, for precoding a second RB.

4. The method of claim 1, further comprising:
selecting a first precoder for precoding a first predetermined number of resource blocks; and
selecting a second precoder, different from the first precoder, for precoding a second predetermined number of resource blocks.

5. The method of claim 1, wherein a precoding granularity for the WTRU-specific reference signals is different than a precoding granularity for the data.

6. The method of claim 1, further comprising:
performing large delay cyclic delay diversity (CDD) processing and discrete Fourier transform (DFT) spreading on the WTRU-specific reference signals and the data.

7. The method of claim 6, further comprising:
on condition that the large delay CDD processing is applied on both the WTRU-specific reference signals and the data, precoding the WTRU-specific reference signals differently than the data.

8. The method of claim 6, further comprising:
pre-shifting the WTRU-specific reference signals before performing the large delay CDD processing.

9. A method for multiple-input multiple-output (MIMO) communication, the method comprising:
receiving channel quality feedback from a wireless transmit/receive unit (WTRU) for each one of a plurality of transmission points;
dynamically partitioning resources among the plurality of transmission points in a plurality of domains; and
transmitting data from the plurality of transmission points to the WTRU according to the dynamically partitioned resources, wherein transmitting the data from the plurality of transmission points comprises transmitting different layers of data from different transmission points.

10. The method of claim 9, further comprising:
assigning each transmission point of the transmission points a separate channel state information (CSI) reference signal (RS) resource.

11. The method of claim 9, further comprising:
applying a hopping scheme across a transmission.

12. The method of claim 9, wherein the transmission points are defined in a set.

13. The method of claim 9, further comprising:
applying a randomly selected precoder for each resource block (RB) or resource block group (RBG) transmitted from a different transmission point.

14. The method of claim 9, wherein the plurality of domains includes time, frequency and space.

15. A base station, comprising:
a processor; and
a transmitter in communication with the processor,
wherein the processor is configured to:
randomly select at least one precoder; and
precode wireless transmit/receive unit (WTRU)-specific reference signals and data using the at least one precoder to generate precoded WTRU-specific reference signals and precoded data, wherein the processor is configured to precode the WTRU-specific reference signals differently than the data; and
wherein the transmitter is configured to transmit the precoded WTRU-specific reference signals and the precoded data via a plurality of antennas.

16. The base station of claim 15, wherein the processor is further configured to:
select a first precoder for precoding a first resource block (RB); and
select a second precoder for precoding a second RB.

* * * * *